United States Patent [19]

Pilborough et al.

[11] Patent Number: 5,428,548
[45] Date of Patent: Jun. 27, 1995

[54] METHOD OF AND APPARATUS FOR SCANNING THE SURFACE OF A WORKPIECE

[75] Inventors: David I. Pilborough, Wotton-Under-Edge; Nigel S. Workman, Dursley; James D. Mortimer, Gloucester, all of United Kingdom

[73] Assignee: Renishaw plc, Gloucestershire, United Kingdom

[21] Appl. No.: 111,436

[22] Filed: Aug. 25, 1993

[30] Foreign Application Priority Data

Sep. 12, 1992 [GB] United Kingdom ............... 9219383
Jan. 23, 1993 [GB] United Kingdom ............... 9301323

[51] Int. Cl.⁶ .................................................. G05B 19/18
[52] U.S. Cl. .......................... 364/474.37; 364/474.03; 33/504
[58] Field of Search ............... 364/474.03, 474.05, 364/474.37, 550, 551.01, 551.02, 559–565, 474.34–474.35; 318/578, 572, 560, 568.16, 569, 571; 409/85, 92–93, 98, 114, 125–129, 93, 121; 33/503–505, 555, 561, 556–558

[56] References Cited

U.S. PATENT DOCUMENTS

| | | |
|---|---|---|
| 3,250,012 | 5/1966 | Hilton et al. |
| 4,118,871 | 10/1978 | Kirkham. |
| 4,195,250 | 3/1980 | Yamamoto. |
| 4,702,652 | 10/1987 | Rokksku et al. ............... 364/474.03 |
| 4,755,950 | 7/1988 | Rao ............................... 364/474.37 |
| 4,901,218 | 2/1990 | Cornwell. |
| 5,010,491 | 4/1991 | Biasillo et al. ............... 364/474.37 |
| 5,115,401 | 5/1992 | Oyama et al. ............... 364/474.37 |
| 5,212,646 | 5/1993 | McMurtry ..................... 364/474.03 |
| 5,220,510 | 6/1993 | Araki ........................... 364/474.37 |
| 5,317,517 | 5/1994 | Matsuura et al. ............ 364/474.03 |

FOREIGN PATENT DOCUMENTS 0357774 3/1990 European Pat. Off. .
2754732 6/1978 Germany .

*Primary Examiner*—Roy N. Envall, Jr.
*Assistant Examiner*—J. Trammell
*Attorney, Agent, or Firm*—Oliff & Berridge

[57] ABSTRACT

Apparatus for and a method of scanning a workpiece are in the form of a retrofit package which provides a scanning capability for a machine tool which would otherwise have none. The basic elements of the package are a scanning probe, a computer, an interface between the probe and the computer, and a link between the computer and the RS232 (or other serial port) of the machine controller for communicating between the two. According to the method, the computer signals the machine control system to drive to a target position and stop, reads the probe outputs when the machine has stopped, calculates a new target position and signals it to the machine control system. To ensure that the machine has stopped the computer calculates time intervals based on its knowledge of the machine velocity, or motion signals based on a motion sensor or the probe outputs and only latches the probe readings when the time has expired or when the probe/motion sensor indicates that motion has ceased.

14 Claims, 3 Drawing Sheets

METHOD OF AND APPARATUS FOR SCANNING THE SURFACE OF A WORKPIECE

BACKGROUND OF THE INVENTION

1. Field of the Invention

The present invention relates to a method of and apparatus for scanning the surface of a workpiece.

2. Description of the Related Art

Fully integrated machine probing systems are known for scanning workpiece surfaces for example from machines tools made by the Companies Rambaudi, Maho and Jobs.

In such known systems a probe and the machine control system are connected so that the machine control system instructs the machine to drive along a predetermined vector. The probe readings and the machine scale readings are continuously fed back to the control system, and at regular intervals the control system latches the probe readings, calculates a vector for continued probe movements, and sends a new command to the motor drive system of the machine.

Where a machine has no fully integrated probing system for scanning, it is desirable to have a "plug-in" probing system which can be retro-fitted to the machine to enable it to carry out scanning operations.

One attempt to produce a "plug-in" scanning package for a machine has been made by the Le Moine Company of the U.S.A. This system makes use of the fact that the control system of a CNC machine tool has a positional feedback loop which includes the machine motor drives, the machine scales and a controller, whereby a cutting tool can be driven accurately through a machining cycle. The system provides a scanning probe and an additional computer (PC) which issues commands to the machine controller motor drives. The feedback signals from the positional feedback loop of the machine to the controller are tapped to provide readings of the instantaneous probe position to the PC, and the probe output signals are also passed to the PC.

While this system achieves the objective of enabling machines hitherto without a scanning capability to be given a "plug-in" scanning option, it requires a costly process of tapping into the machine's control architecture to provide the feedback signals to the PC, and an expensive program card for the PC to enable it to receive the feedback signals both from the machine and the probe and to act on these signals to produce the drive commands to be sent to the machine controller.

An object of the present invention is to produce a retrofit package for a machine tool which provides the machine tool with a scanning capability in a relatively inexpensive manner.

Another object of the invention is to provide a machine tool with a method of, and apparatus for, scanning which operates via a computer separate from the machine controller without the need for feedback signals from the machine.

SUMMARY OF THE INVENTION

According to one aspect of the present invention there is provided a method of scanning a workpiece using a machine having a control system, a measuring probe capable of providing outputs indicative of changes in the surface profile of the workpiece, a further computer connected to the machine control system, and an interface between the probe and the computer whereby the probe outputs are fed to the computer, the method comprising the steps of:

sending a signal from the computer to the machine control system to command the machine to drive the probe to a target position and stop, producing time and/or motion based signals independently of the machine control system to ensure that the machine has achieved the target position and stopped, latching the probe outputs when the machine has stopped, receiving the probe outputs in the computer, and on the basis of the probe outputs, cause the computer to calculate a new target position and send a further signal from the computer to the machine control system to command the machine to drive the probe to a new target position.

The invention according to another aspect includes apparatus for carrying out the above-described method.

In order to ensure that the probe readings are not latched before the machine has stopped, one embodiment of the invention envisages allowing a minimum time interval to pass before latching the probe readings. The time interval may be determined by simple calculation from the known speed of the machine, or calibrated from actual machine movements and made sufficiently long to ensure that the machine will have stopped.

Alternatively the probe readings may be read continuously for the whole or part of the machine movement, and not latched until they have remained unchanged for a predetermined time.

In a preferred embodiment however, a combination of the two above-described methods may be used.

Also in a preferred embodiment the probe is an analogue probe with a surface contacting stylus.

Thus the invention enables the probe and machine positions to be synchronised without the need to derive a signal from any part of the machine control system.

BRIEF DESCRIPTION OF THE DRAWINGS

An example of the method and apparatus of the present invention will now be described with reference to the accompanying drawings in which.

DESCRIPTION OF THE PREFERRED EMBODIMENTS

Figure 1:
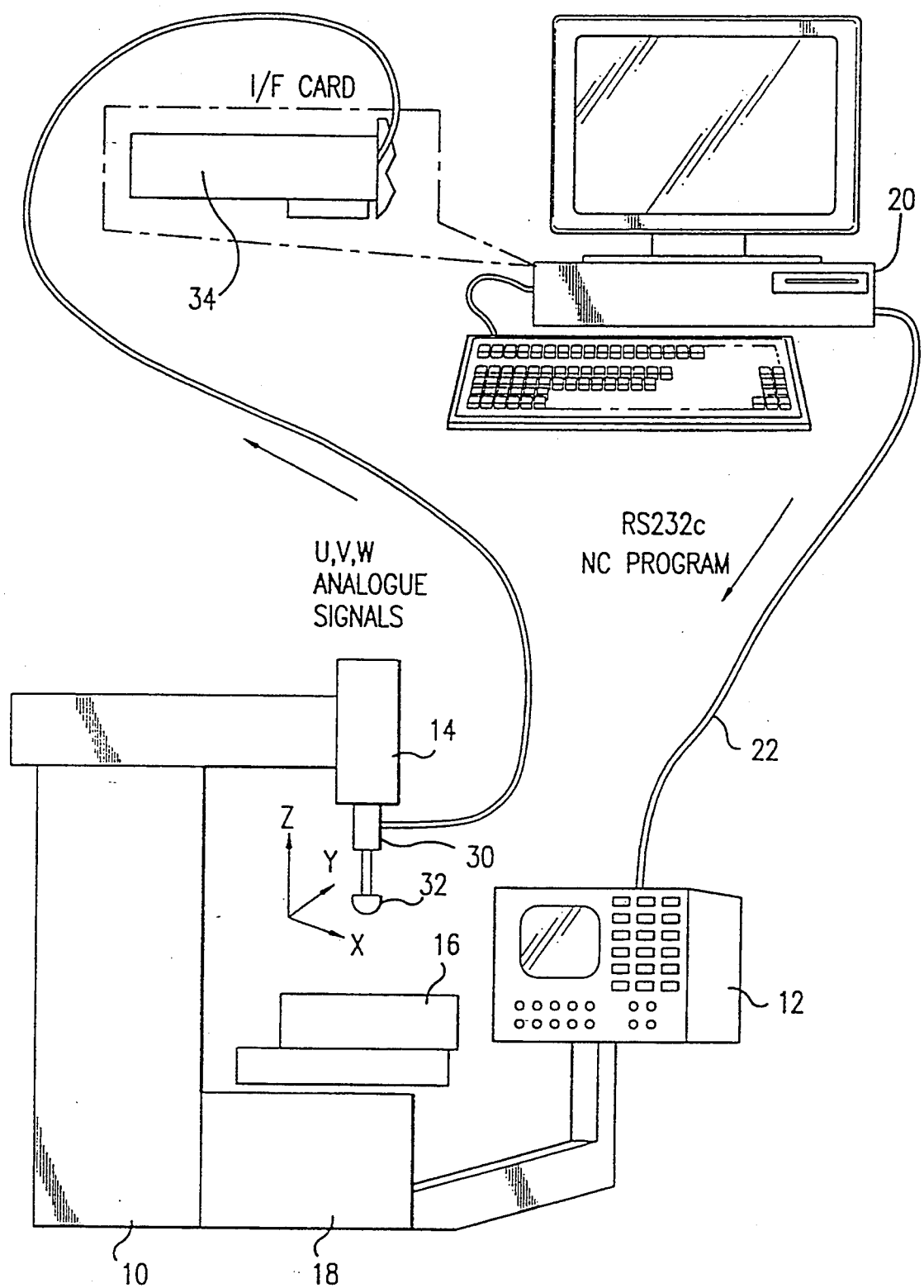
FIG. 1 shows diagrammatically the apparatus for scanning in accordance with the invention.

Referring now to FIG. 1, there is shown a machine tool 10 having a control system including a controller 12, and a tool holding spindle 14. The machine tool is commanded by the controller to move the spindle in three co-ordinate axes x, y and z within the working volume of the machine using conventional motors (not shown) for performing machining operations on a workpiece 16 supported on the machine table 18. Conventional scale systems (not shown) provide feedback to the controller relating to the instantaneous position of the machine spindle in all three axes x, y and z. The machine controller is provided conventionally with an RS 232 input port which is used in accordance with the invention for receiving instructions from an additional computer (PC) 20 via a cable 22.

The present invention is concerned with existing machine tools which do not have the required interface or dedicated control functions for scanning workpieces with a measuring probe. Such probes produce analogue or digital measuring outputs in orthogonal axes u,v and w which in the case of an analogue probe are related to the magnitudes of the deflection of the stylus of the probe. These probe outputs are in addition to those measuring feedback outputs provided by the machine scale systems. The provision of the control functions required to provide the machine with the additional scanning capability using measuring probe outputs has hitherto required a significant revision of the machine control architecture.

The present invention enables a machine to be provided with a scanning capability in a much simpler and less expensive manner with a "plug-in" package which can simply be added to the existing machine.

The package consists of a measuring probe 30, which may be of any conventional design which provides the required analogue or digital signals, for example as described in our International publication no. WO90/04149. The probe 30 has a stylus 32 for contacting the workpiece.

A cable connection is provided to an interface card 34 which can be simply plugged into the PC and which is capable of receiving the measuring outputs of the probe and by conventional signal processing techniques of delivering data to the PC in appropriate form.

In accordance with the method of the present invention, once the probe has been installed and datumed, the spindle 14 is moved by the controller 12 to position the probe with its stylus in contact with the workpiece.

The PC is programmed with all of the algorithms for the scanning operation and now takes over the control of the scanning operation by sending its commands to the controller 12 via the RS 232 link 22.

The preferred method comprises the following steps:
1. The PC commands the machine to move a small distance interval to a target position within the working range of the probe, for example 1 mm in one of the x,y or z directions, or in a direction the vector of which is inclined to one or more of these directions.
2. When the machine has reached its target position and stopped, an indication of which is derived by one of the methods described below, the probe readings at the new position are latched by the PC and a new target direction and position is calculated.
3. The machine is then commanded by the PC via the machine controller to move to the new position.

The invention includes several alternative ways of ensuring that the machine has reached its target position and has stopped without having to tap into the machine's feedback control system.

In a first embodiment, the indication that the machine has achieved the target position is derived from a clock in the PC which is programmed to produce a signal after an allotted interval of time which is sufficiently long, taking into account the assumed speed of movement of the machine, that the machine can safely be assumed to have stopped at the new position. The signal from the clock is used to cause the PC to read the probe outputs at that time. This method however, while simple and inexpensive, makes for a relatively slow scanning procedure.

In a refinement of the method, a more accurate calibrated time interval may be determined by calibrating the machine prior to starting the scanning operation. This may be done by driving the probe into contact with the workpiece, and timing the movement of the machine over the desired small distance interval in different directions while reading the outputs of the probe in order to determine the amount of movement of the machine. This calibrated time interval can then be programmed into the PC algorithm and will be shorter than the time interval which would otherwise have to be allotted.

Figure 2A:
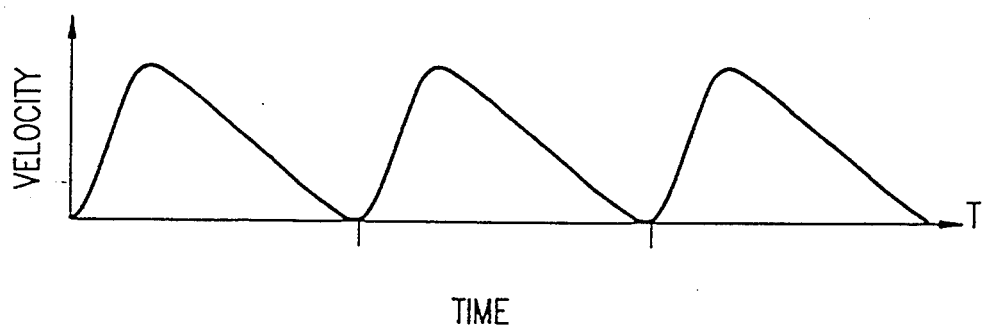
FIGS. 2a, 2b and 2c illustrate the synchronisation of the probe data and machine movement in a preferred embodiment of the invention.
Figure 2B:
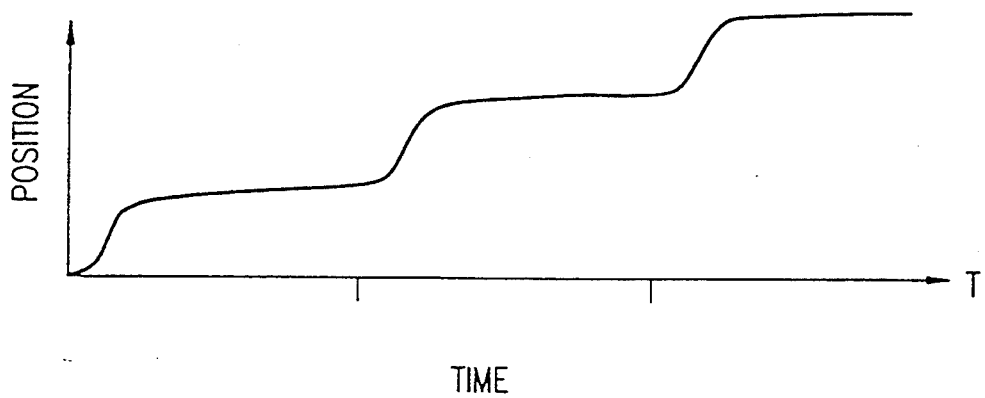

As can be seen from FIG. 2b the actual point at which the required distance movement is achieved is not easy to determine as the machine velocity is approaching zero. In a refinement of the calibration method therefore the machine is commanded to move a certain distance and then reverse back to its original position. As the machine accelerates in reverse from the required position the profile of the machine's position against time changes rapidly. Since this change is relatively easy for the PC to interpret, the onset of the change is used as an indication that the position has been achieved.

The same exercise is done for each machine axis and the longest time taken is used as the calibration time. Also the calibration is performed for various distances up to the maximum movement of the probe stylus.

As a further alternative, an indication that the machine has achieved its target position can be derived by programming the PC to read the probe outputs continuously either from the moment the command is sent to the controller for the machine to move to its target position, or as the end of allotted time interval (or the calibrated time interval) approaches. If, at the end of the time interval the probe outputs are still changing, the algorithm has provision to cause the PC to continue to read the probe outputs until they stop changing before latching the readings. This provides an additional degree of security and accommodates any varying dynamic characteristic of the machine which may cause its speed to be different from the assumed or calibrated speed. If however, at the end of the time interval the probe outputs are not changing, then there are two possible situations. Either the machine has stopped or the probe is at that instant traversing a flat surface the plane of which lies in the scanning direction. It is preferable, therefore that this method is used in conjunction with a timing signal to increase the degree of certainty that the machine has stopped.

Thus it can be seen that using the method and apparatus in accordance with the invention, a scanning capability can be provided on a machine which hitherto had no such capability simply by providing a measuring probe, an appropriate interface card for the PC, an appropriate algorithm for the PC and a cable to connect the PC to the RS 232 port of the conventional controller of the machine. The need to provide feedback from the machine measuring systems to monitor probe movements has been eliminated along with all of the cost and difficulty associated with tapping into the machine control architecture.

The invention enables the probe outputs to be latched in synchronism with known positions of the machine which occur at the end of the selected distance intervals.

Figure 3:
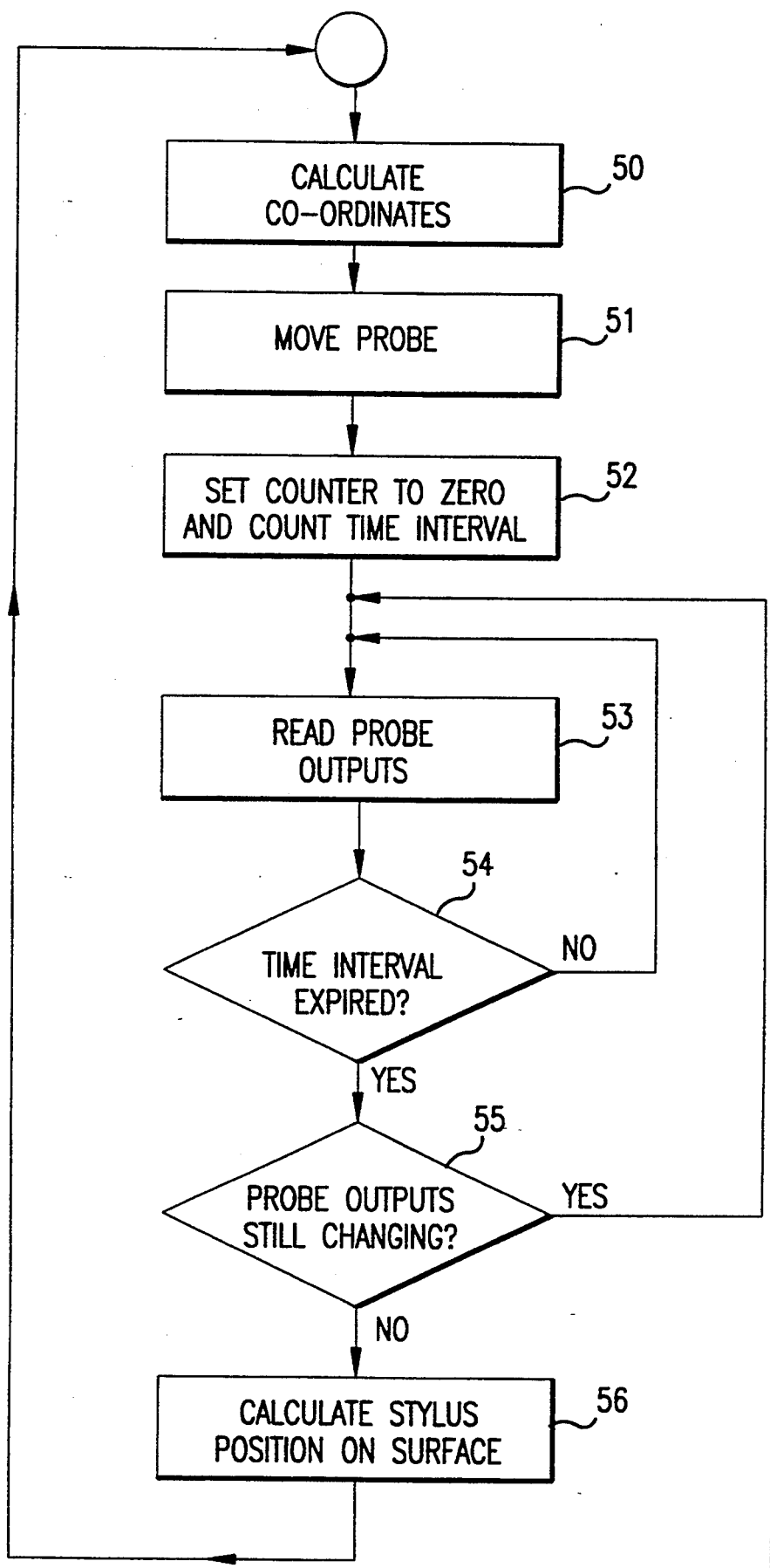
FIG. 3 is a logic flowchart showing how the step of ensuring that the machine has stopped is performed in accordance with a preferred embodiment of the invention.

FIG. 3 shows a logic diagram for the preferred method of ensuring that the machine has stopped. The method is carried out with an analogue probe having a surface contacting stylus and requires the provision of both timing signals and probe stylus movement signals.

Once the machine is set up with the stylus contacting the workpiece, the first step 50 is for the PC to calculate the incremental move for the machine to take the probe to the first point on a pre-selected scanning pattern.

Step 51 is transmission of the move coordinates to the machine controller 12.

Step 52 is to set the timer of the PC to zero and to start counting the pre-selected time interval associated with the required distance interval.

Step 53 is to read the outputs of all three axes of the probe.

At step 54 the PC checks the timer to see if the time interval has expired. If yes, it proceeds to step 55. If no, the programme returns to step 53.

At step 55 the PC checks whether or not the probe readings have changed (within a tolerance band) compared to the last few readings. If yes, the programme returns to step 53. If no, the PC uses the probe readings and the relationship between them and the machine position to calculate at step 56 the point on the surface at which the probe stylus has stopped, and any interpolation information before turning to step 50.

If still greater accuracy is required, a method of providing interpolation within the commanded scanning interval can be provided as described with reference to FIGS. 2a–2c below. This interpolation method can take account of the non-uniform velocity of the machine as it moves over the commanded distance interval. FIG. 2a shows the velocity profile of the machine as it traverses the commanded distance interval. The velocity is plotted along the vertical axis and time on the horizontal axis. It can be seen that the velocity rises from zero to a peak and then falls to zero as the new position is achieved.

FIG. 2b shows how the actual position P achieved at any instant, plotted on the vertical axis, varies with time, plotted on the horizontal axis.

It can be seen that because of the changing velocity the position versus time plot is not a straight line.

Figure 2C:
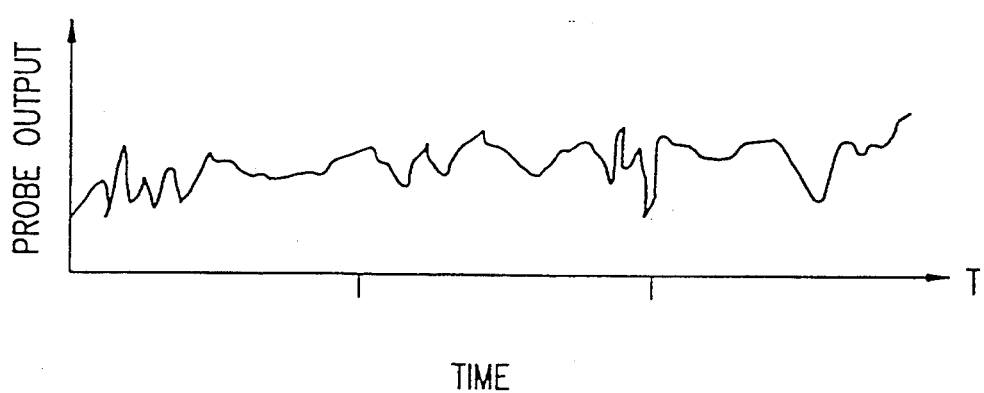

FIG. 2c shows how the probe output PO at any instant, plotted on the vertical axis, varies with time, plotted on the horizontal axis.

The calibration, which can be part of the calibration step referred to above, is made for each axis by driving the probe against a surface which lies normal to the commanded vector and commanding the machine to traverse the required distance interval, within the travel of the probe stylus, while rapidly reading and latching the probe outputs. This synchronizes the probe outputs with the actual position of the machine within the required distance interval so that when the probe is used in the scanning process over the same distance intervals in accordance with the method of the invention, the previously stored calibration map of the machine movements within the intervals, can be referred to for interpolation purposes. By using an interpolation step as described above, the pitch of the scanning points can be increased leading to fewer points being scanned, and higher speeds of machine movement, while generating the same information about the surface profile of the workpiece from a look-up table containing the interpolation information.

Although the invention has been described for application to machine tools, it will be understood that the underlying principles may be applied in co-ordinate measuring machines (CMMs).

Similarly the invention is not exclusively applicable to touch probes but may be applied using non-contact measuring probes which provide analogue or digital outputs, for example optical probes.

In a further embodiment the motion signals which are used to determine whether or not the machine has stopped can be derived from an independent motion sensor attached to a moving part of the machine.

We claim:

1. A method of scanning a workpiece using a machine having a control system and a measuring probe capable of providing outputs indicative of changes in the surface profile of a workpiece, the method comprising the steps of:
    a) providing in addition to the control system of the machine an open loop control system including a computer and a connection between the computer and the control system of the machine which allows input commands to be sent from the computer to the control system, but which does not provide any feedback from the control system of the machine to the computer as to the position of the machine;
    b) interfacing the probe outputs to the computer;
    c) generating within the computer the coordinates of a target position for the probe relative to the workpiece surface;
    d) sending a command from the computer to the control system of the machine to cause the machine to drive the probe to the target position and stop;
    e) receiving the probe outputs in the computer;
    f) producing at least one signal in the computer independently of the control system of the machine for synchronizing the probe outputs with at least one known position of the machine;
    g) using the signal produced in the computer for latching the probe outputs at least when the machine has stopped at the target position; causing the computer to output a new target position.

2. A method as claimed in claim 1 and wherein the step of producing at least one signal for synchronizing the probe outputs with at least one known position of the machine comprises the further steps of:
    calculating the maximum time which the machine would take to travel the required distance to the target position at its known operating speed, and
    after said maximum time has elapsed, producing a signal indicating that the machine has stopped.

3. A method as claimed in claim 2 and wherein the calculation of said maximum time is based on previously calibrated values of the time taken by the machine to travel the required distance to the target position at its normal operating speed and which are stored in the memory of the computer.

4. A method as claimed in claim 1 and wherein the step of producing at least one signal for synchronizing the probe outputs with at least one known position of the machine comprises the further steps of continuously reading the outputs of the probe as the machine approaches the target position, and generating a first signal indicating that the machine has stopped when the probe outputs do not change.

5. A method as claimed in claim 4 and including the further steps of calculating a maximum time which the machine would take to reach the target position and generating a second signal indicative thereof and causing the probe outputs to be latched only when both said first and second signals have indicated that the machine has stopped.

6. A method as claimed in claim 5 and wherein the method comprises the further steps of:
waiting until a calibrated time interval for the machine to achieve the target position has passed,
continuously reading the probe outputs at least towards the end of the time interval and until the probe outputs do not change,
sending a signal indicating that the machine has reached its target position and stopped when the time interval has expired and the probe outputs do not change.

7. A method as claimed in claim 1, and wherein the step of producing at least one signal for synchronizing the probe outputs with at least one known position of the machine comprises the further steps of monitoring the output of a motion sensing device attached to a component of the machine which takes part in the movement of the machine, and producing a signal when the motion sensing device indicates that the movement of the component has stopped.

8. A method as claimed in claim 1, and wherein the method comprises the further step of calculating the incremental move required for the machine to move to a new target position.

9. A method as claimed in claim 1, and wherein the method comprises the further step of reiterating steps d) to f) until the scanning process is complete.

10. Apparatus for scanning a workpiece comprising a machine having a control system, a measuring probe capable of providing outputs indicative of changes in the surface profile of the workpiece, and an additional open loop control system for controlling a scanning operation of the machine through the control system of the machine, the additional open loop control system comprising:
a computer;
a connection between the computer and the control system of the machine to enable input commands to be sent from the computer to the control system of the machine to drive the machine to a target position, but which does not provide any feedback from the control system to the computer as to the position of the machine;
an interface between the measuring probe and the computer whereby the probe outputs are passed to the computer; and
wherein the computer includes means for generating signals independently of the machine control system for synchronizing the probe outputs with known positions of the machine and for latching the probe outputs at least at said target position of the machine, means for calculating from the latched outputs of the probe the coordinates of the surface profile of the workpiece at said target position of the machine, means for calculating a new target position, and means for sending a command to the machine control system to drive the machine to the new target position.

11. Apparatus for scanning a workpiece as claimed in claim 10 and in which the control system of the machine has an RS232 input port for receiving input commands, and the connection between the computer and the control system is made at the RS232 input port.

12. Apparatus for scanning a workpiece comprising a machine having a control system, a measuring probe capable of providing outputs indicative of changes in the surface profile of the workpiece, and an additional open loop control system for controlling a scanning operation of the machine through the control system of the machine, the additional open loop control system comprising:
a computer;
a connection between the computer and the control system of the machine to enable input commands to be sent from the computer to the control system of the machine to drive the machine to a target position, but which does not provide any feedback from the control system to the computer as to the position of the machine; and
an interface between the measuring probe and the computer whereby the probe outputs are passed to the computer.

13. Apparatus for scanning a workpiece as claimed in claim 12, wherein the computer includes means for generating signals independently of the machine control system for synchronizing the probe outputs with known positions of the machine and for latching the probe outputs at least at said target position of the machine, means for calculating from the latched outputs of the probe the coordinates of a point on the surface of the workpiece at least at said target position of the machine, and means for sending a command to the machine control system to drive the machine to the new target position.

14. Apparatus for scanning a workpiece as claimed in claim 13, and wherein the computer includes means for calculating the incremental move required for the machine to move to a new target position.

* * * * *